Figure 1:
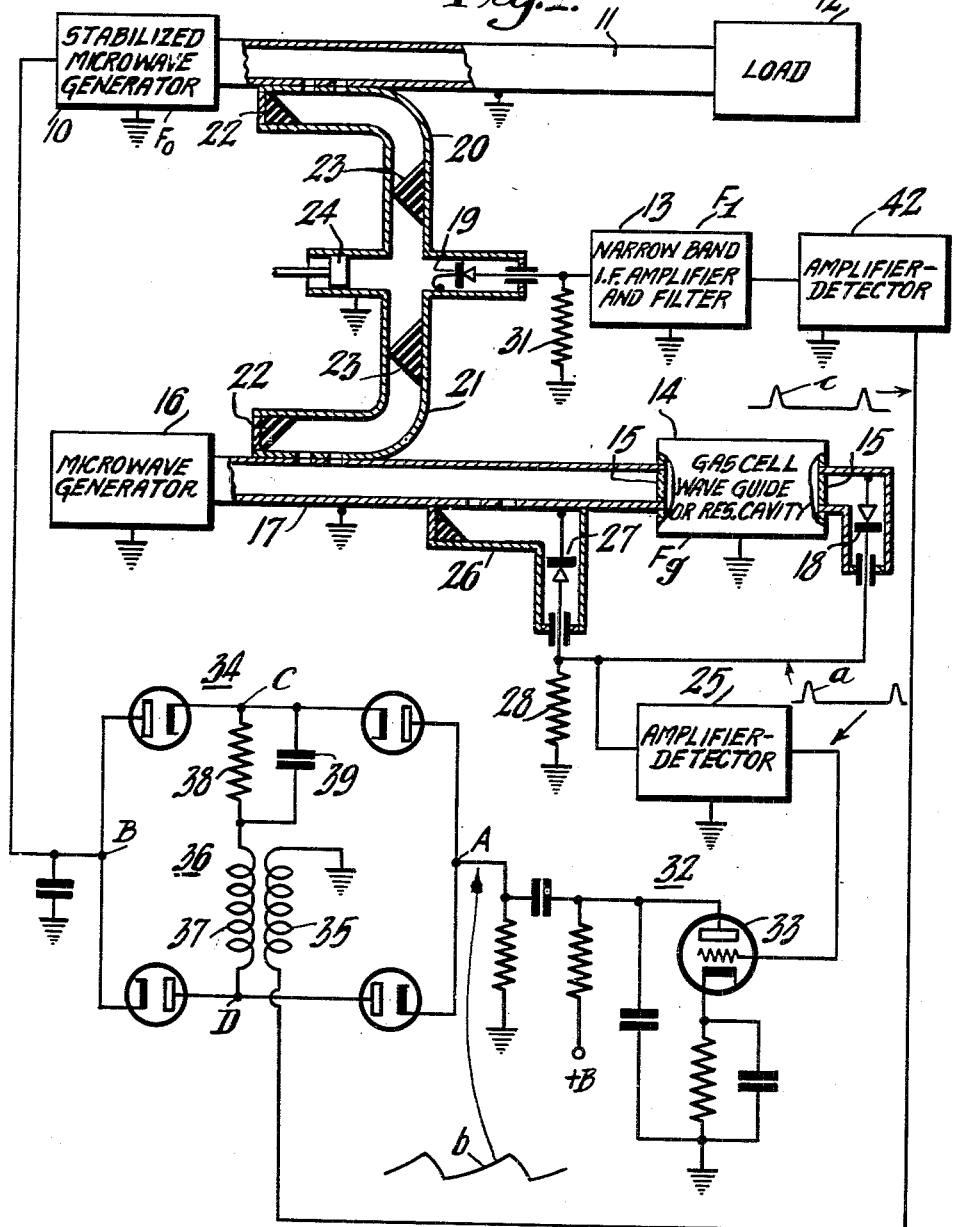

INVENTOR
William D. Hershberger
BY J. L. Whittaker
ATTORNEY

Feb. 15, 1955     W. D. HERSHBERGER     2,702,351
METHOD OF AND MEANS FOR STABILIZING MICROWAVE FREQUENCIES
Filed Jan. 27, 1948     4 Sheets-Sheet 2
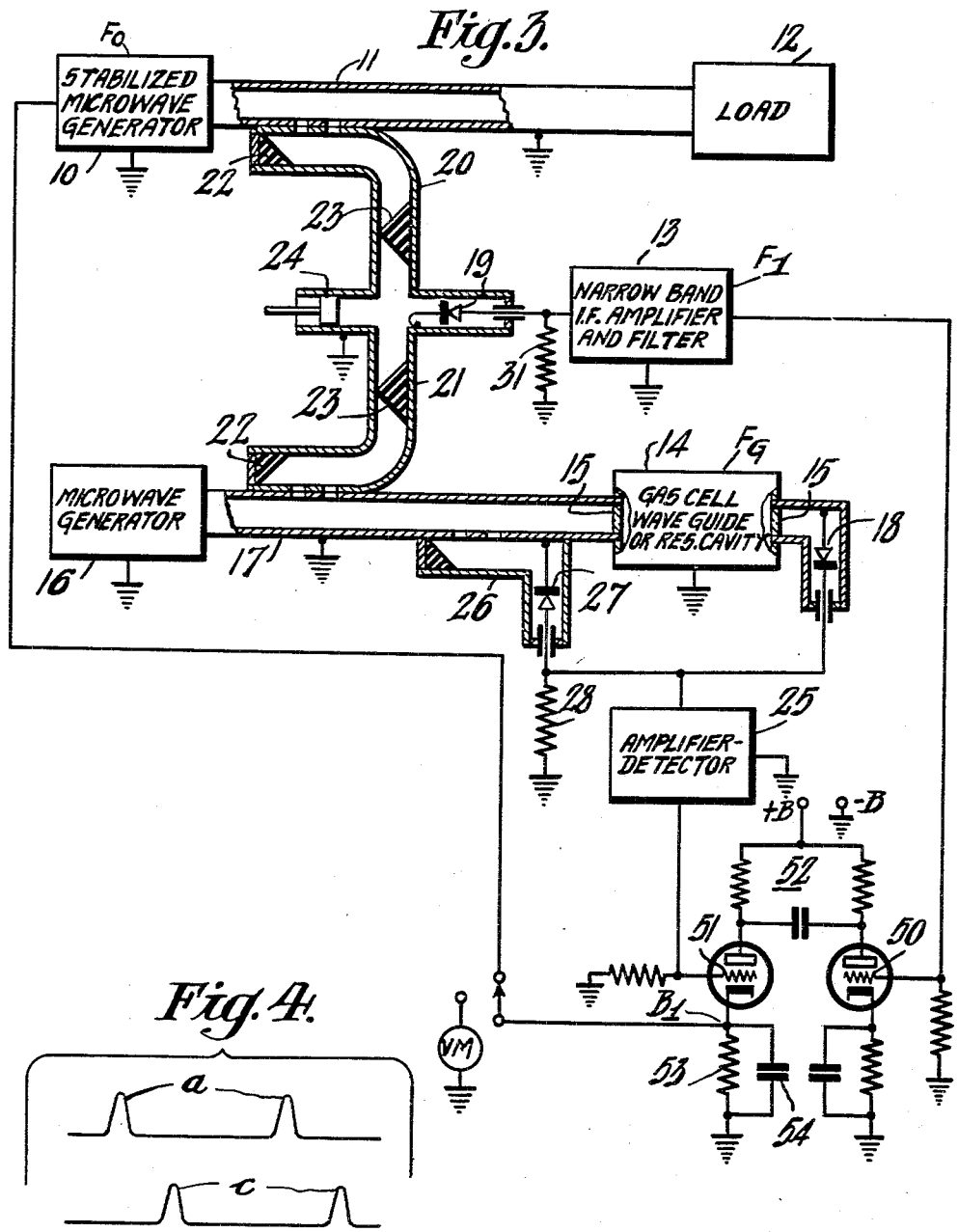
INVENTOR
William D. Hershberger
BY J. L. Whittaker
ATTORNEY Feb. 15, 1955  W. D. HERSHBERGER  2,702,351
METHOD OF AND MEANS FOR STABILIZING MICROWAVE FREQUENCIES
Filed Jan. 27, 1948  4 Sheets-Sheet 3
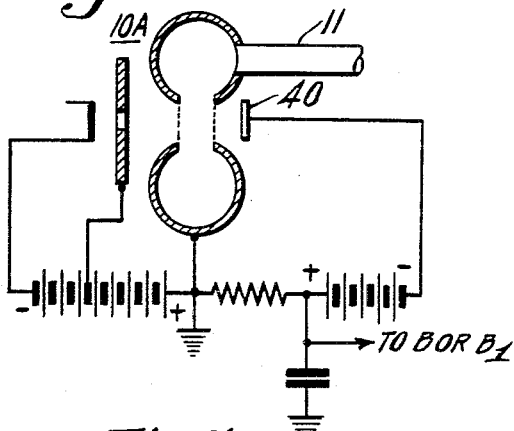
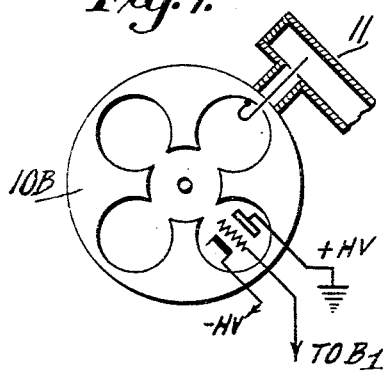
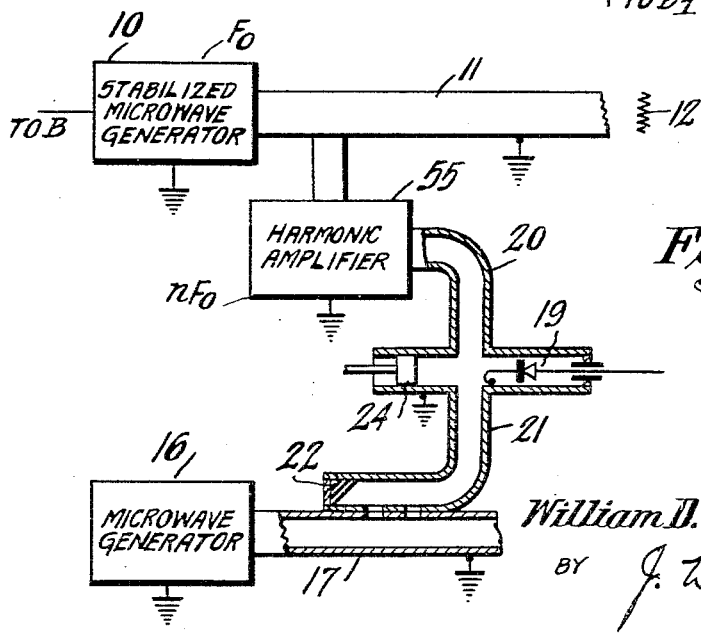
INVENTOR
William D. Hershberger
BY J. L. Whittaker
ATTORNEY Feb. 15, 1955 W. D. HERSHBERGER 2,702,351
METHOD OF AND MEANS FOR STABILIZING MICROWAVE FREQUENCIES
Filed Jan. 27, 1948 4 Sheets-Sheet 4

INVENTOR
William D. Hershberger
BY
ATTORNEY

United States Patent Office 2,702,351
Patented Feb. 15, 1955

2,702,351

METHOD OF AND MEANS FOR STABILIZING MICROWAVE FREQUENCIES

William D. Hershberger, Princeton, N. J., assignor to Radio Corporation of America, a corporation of Delaware Application January 27, 1948, Serial No. 4,497

14 Claims. (Cl. 250—36)

This invention relates generally to determination of the frequency of microwave oscillators, and in particular to methods of and systems for stabilizing microwave frequencies by utilization of the resonance effects exhibited by certain gases.

The microwave absorption spectra of ammonia, carbonyl sulphide, methyl halides and other gases having a dipole moment comprise "lines" of distinctive and different frequency distribution for each gas. At very low pressures, in the case of ammonia, each of these "lines" breaks up into a plurality of sharply defined lines, each precisely corresponding with a definite frequency which is independent of temperature, pressure and other known factors except relatively strong magnetic or electrostatic fields. In my copending applications, Serial Nos. 786,736 and 1,240 there are disclosed methods and systems for stabilizing a microwave oscillator so that its frequency corresponds with a selected resonant frequency of a chosen gas: in my copending application Serial No. 5,563 there are disclosed methods and systems of frequency stabilization in which the molecular resonant frequency of a gas is shifted by subjecting it to a strong field. It is thus possible to provide for generation of many precise frequencies scattered in the microwave spectrum, but it is not possible by such methods or systems to obtain stabilization at desired frequencies other than the discrete frequencies corresponding with the molecular resonances of the gases.

In accordance with the present invention, a microwave oscillator may be stabilized so that its frequency, or a chosen multiple thereof, precisely differs by any desired amount from a selected resonant frequency of a particular gas so that stabilization may be obtained at any frequency in the microwave spectrum and with precision at least equal to that obtainable at lower frequencies by use of piezocrystals.

More specifically, in accordance with the present invention, energy from a frequency-modulated control generator is applied to a gas cell to provide a series of electrical pulses, each occurring upon coincidence of the generator frequency with the frequency of molecular resonance of the gas. The frequency-modulated control generator is also connected to a demodulator to which is connected either the microwave oscillator to be controlled or an amplifier operating at the same frequency or other frequency having fixed numerical relation thereto. The resulting demodulation products are impressed upon a selective filter designed to pass a frequency which added to or subtracted from the desired oscillator frequency, or multiple thereof, is equal to the resonant frequency of the gas. Thus, the filter output is a second series of pulses whose phase relation with respect to the first series of pulses varies with deviation of the microwave oscillator frequency from the desired value. The two series of pulses are utilized jointly to produce a unidirectional control voltage of magnitude dependent upon the phase relation of the pulses and which may be applied to the controlled microwave oscillator to reduce the deviation of its frequency from the desired value.

Further in accordance with the present invention, when the controlled microwave generator is to be frequency-modulated, as at audio or video frequencies, it is provided that the modulation rate of the control generator shall be well below the lowest modulation frequency of the controlled or stabilized oscillator.

The invention further resides in methods and systems having the features hereinafter described and claimed.

Figure 2:
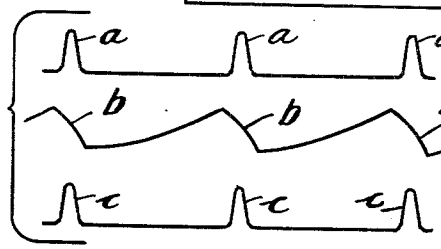
Figure 8:
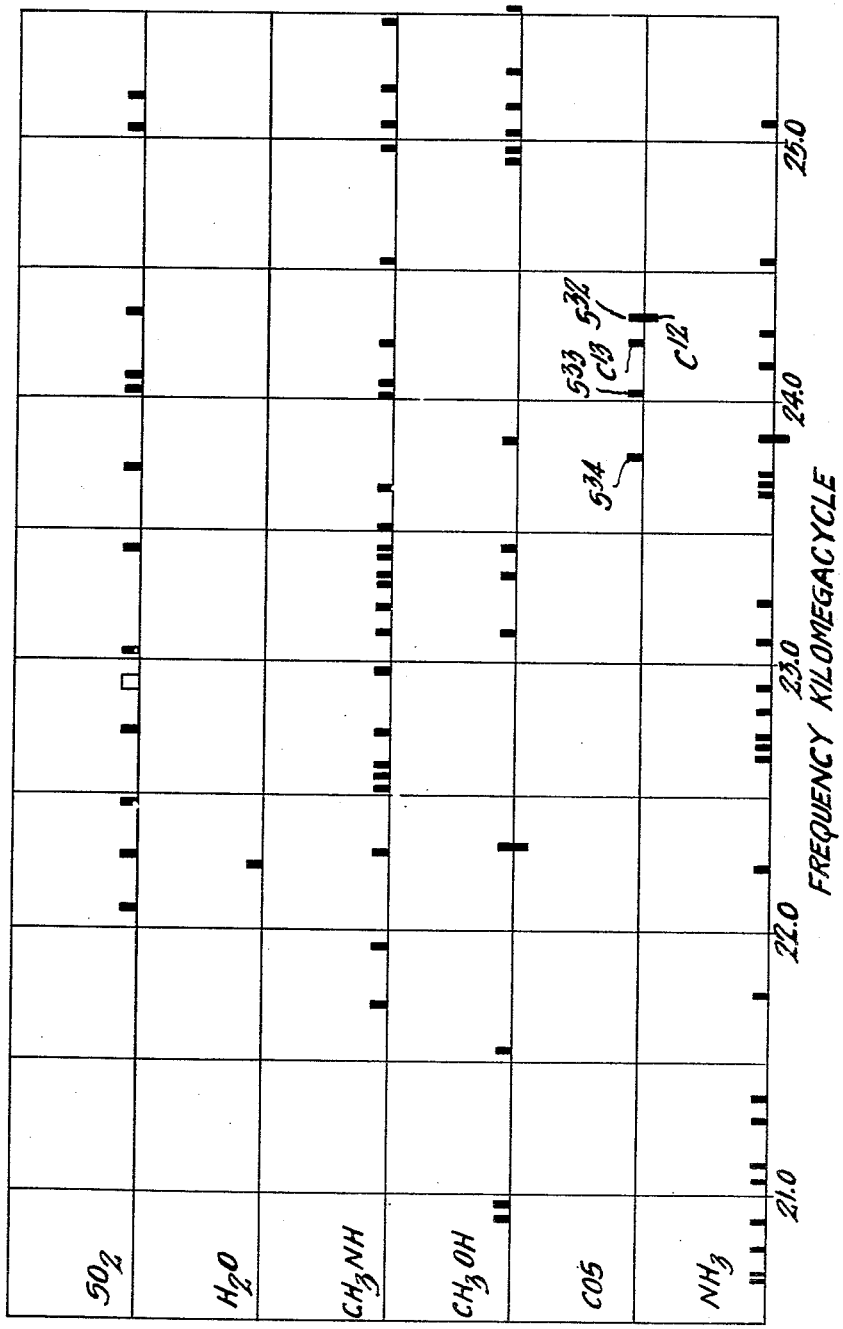

For a more detailed understanding of the invention and for illustration of systems incorporating it, reference is made to the accompanying drawings in which:

Figure 1 is a block diagram of a control system for stabilizing a microwave generator;

Figure 2 comprises curves referred to in explanation of the operation of Figure 1;

Figure 3, in block diagram, illustrates a modification of the system shown in Figure 1;

Figure 4 shows curves referred to in explanation of operation of Figure 3;

Figure 5 schematically illustrates one specific type of microwave generator suited to be controlled in accordance with Figures 1 and 3;

Figure 6 is a block diagram showing components appearing in Figures 1 and 3 and a harmonic amplifier for the controlled oscillator;

Figure 7 schematically illustrates another type of microwave generator suited for inclusion in the systems of Figures 1 and 3; and Figure 8 is a table of certain gases and their absorption frequencies in part of the microwave spectrum.

Referring to Figure 1, the microwave generator 10, which may be a magnetron, klystron or other known type of oscillator suitable for operation at very high frequencies, is suitably coupled by the waveguide 11 or other suitable transmission line to an antenna or other load generically represented by the block 12. The filter 13 is designed to be selective at a frequency $F_1$ which added to (or subtracted from) the desired operating frequency $F_0$ of the oscillator 10 corresponds with the frequency $F_g$ for which a gas within the cell 14 exhibits molecular resonance. Preferably, the cell 14 is a matched waveguide section; alternatively, it may be a cavity resonant at the frequency $F_g$, although its resonance curve is far broader than that of the gas. The cell 14 is provided with windows 15, 15 which are of material transparent to microwave energy and impervious to the gas: they may, for example, be of mica about 0.002" or 0.005" thick.

In general, gases having dipole moments may exhibit molecular resonances in the microwave spectrum, the resonant lines being of distinctive and different frequency distribution for the different gases. At very low pressures, for example, of the order of 0.3 millimeter of mercury, these absorption "lines," in the case of ammonia for example, break up into a plurality of still more sharply defined lines, each corresponding with a frequency which is constant despite variations in pressure, temperature and other known factors except strong electric or magnetic fields. Of these gases, ammonia gas itself provides a large number of lines within the range of frequencies corresponding with from 1.10 centimeters to 1.42 centimeters. Other gases such as $SO_2$, $H_2O$, COS, $CH_3NH_2$ and $CH_3OH$, (Figure 8) exhibit selective absorption in the microwave region and provide still additional standard frequencies, any one of which may be selected as the resonance frequency of the gas cell.

Frequency $F_g$ having thus been selected by choice of gas, the filter frequency $F_1$ is then selected so that the frequency $F_g$, plus or minus the filter frequency $F_1$, corresponds with the desired oscillator frequency $F_0$ or a multiple thereof: it should be noted the selected filter frequency may be zero although ordinarily it will be of the order of megacycles.

The second microwave generator 16 is frequency-modulated to sweep over a rather wide range of frequencies including the frequency $F_g$. This generator may be a magnetron, klystron, or any other type of microwave generator, and it may be frequency-modulated in any known manner, as by a mechanical modulator, or by application thereto of a modulating control voltage, for example, the output voltage of a sawtooth generator operating at a search frequency of 60 cycles per second or any other convenient frequency low compared to any frequency applied for frequency-modulation of controlled generator 10. The generator 16, hereinafter briefly referred to as the control generator, is connected to the gas cell 14 by the waveguide 17, or other suitable transmission line, so that in each cycle of the modulating-frequency of generator 16 there is absorption by the cell precisely at the frequency for which it exhibits molecular resonance. Consequently, in each cycle of the modulating-frequency, the output of the rectifier 18 connected to the transmission line 17 beyond the gas cell abruptly changes, producing a control pulse which is utilized as hereinafter more specifically described.

The outputs of both of the generators 10 and 16 are impressed upon a rectifier 19 in whose output circuit is included the aforesaid filter 13 whose pass-band is narrower than the band-width of the frequencies passed by the gas cell 14. Thus, in each cycle of the low search frequency of the frequency-modulated control generator 16, there is produced at the output terminals of the filter 13 a short control pulse which may coincide with or occur before or after the pulse appearing, during the same cycle of the search frequency, in the output circuit of the rectifier 18. In brief, there are produced two series of pulses whose phase difference depends upon the deviation of the generated frequency $F_0$ from its desired value. If the generated frequency $F_0$ is of the desired or normal value, the pulses appearing respectively in the output circuits of the rectifiers 18 and 19 are in phase, and as will hereinafter appear, there is produced no control effect which affects the operating frequency of generator 10. When, however, the pulses are not in phase, the phase difference is utilized to produce a control effect which reduces the deviation of the generated frequency from its desired value. The two series of pulses, after suitable amplification, may be impressed upon any suitable type of phase-detector, such as a balanced rectifier circuit, Figure 1, or a multi-vibrator circuit, Figure 3, to provide a unidirectional control voltage which may be applied, for example, to an electrode of the controlled oscillator tube: the control voltage may, for example, be utilized as a variable component of the voltage of the reflector anode of a klystron, Figure 5, or of the anode of a conventional magnetron, or of a control grid disposed in a cavity of a magnetron, Figure 7.

Reverting to Figure 1 for a more specific discussion of the particular arrangement there shown, the mixer rectifier 19, or equivalent, is connected to the generators 10 and 16 by directional couplers 20 and 21 jointly forming a balanced circuit which permits flow of microwave energy from the generators to the rectifier 19, but minimizes interchange of energy between the generators. Each of the directional couplers may comprise a waveguide section coupled to the associated guide 11 or 17 by a pair of windows or apertures whose center to center spacing may be approximately one-quarter wavelength. At its closed end near the waveguide 11 or 17, each of the directional couplers is preferably provided with an absorption wedge 22 in avoidance of reflections within the coupler. Each of the directional couplers is also provided intermediate the waveguide 11 or 17 and rectifier 19 with a decoupling wedge 23. At the junction of the directional couplers there are provided two right-angle extensions or cavities, one of which is coupled to the rectifier 19 and the other of which is tunable as by plunger 24, to match the rectifier impedance.

With the relations of the microwave generator 16, gas cell 14 and rectifier 18 thus far described, the pulses in the output circuit of the rectifier are of negative polarity, that is, the peak of the pulse corresponds with minimum transmission through the gas cell. These pulses may be converted into positive pulses by proper choice of the number of stages in the amplifier 25 or in any other known way, as by use of a transformer.

To effect cancellation of the effects of any amplitude-modulation of the control generator 16 upon the amplifier-detector connected in the output circuit of rectifier 18, there is connected to the waveguide in advance of the gas cell 14 a directional coupler 26 for impressing the output of generator 16 upon a rectifier 27 poled in opposition to the rectifier 18 and having the common output resistor 28. Thus, as the frequency of generator 16 is swept through a range including the frequency $F_g$, the rectifier outputs are balanced and no current flows through resistor 28 except at the frequency $F_g$. The sharp pulses impressed upon the amplifier-detector 25 are amplified and rectified to provide a series of recurrent sharp pulses $a$, Figure 2, which, assuming the search frequency applied to the generator 16 is constant, appear at regular intervals. The amplifier 25 is blocked for each return sweep of the generator 16 so that only one pulse appears per cycle of the search frequency or the sweep may be a sawtooth wave and the pulse during the fly-back period of each cycle may be filtered out.

The sharp pulses in the output circuit of the amplifier detector 25 are impressed upon a shaping circuit 32 comprising an amplifier tube 33 to apply between the terminals A and B of the rectifier-bridge 34 a series of pulses $b$ having the same repetition rate as pulses $a$ but having leading and trailing edges which are less steep than those of pulses $a$.

The pulse output of the filter 13 is amplified and rectified to produce a series of current pulses $c$ which flow through the primary winding 35 of a transformer 36 whose secondary winding 37 is connected in series with resistor 38 between the points C and D of the rectifier bridge 34. The resistor 38 and condenser 39, in shunt thereto, provide a network having a relatively long time constant, for example, of the order of one or two seconds when the search frequency is 60 cycles per second. For protection against rapid frequency changes, the search rate is increased and the time constant of the RC network 38, 39 is decreased to permit it to transmit rapidly varying error information. When the oscillator 10 is frequency-modulated, it may be stabilized against drift by using a search frequency for control oscillator 16 which is somewhat lower than any modulating frequency applied to oscillator 10 and the time constant of the RC network 38, 39 is correspondingly increased.

The magnitude and direction of current supplied to the network 38, 39 depends upon the time relation between the peaks of the pulses $c$ with respect to peaks of the pulses $a$, and the magnitude of the unidirectional potential at point B of the rectifier network therefore depends upon the phase relations between the two series of pulses. The unidirectional control voltage so derived may be applied as shown in Figure 5 to vary the potential of the anode 40 of a reflex klystron 10A, Figure 5, shown as one example of a microwave generator which can be controlled in accordance with the present invention. Whether or not the derived voltage is utilized to stabilize the generated frequency, it may be applied to any suitable voltage responsive device for measurement of the frequency deviation of the oscillator 10.

It is to be understood, of course, that the control voltage so derived may be applied to other types of high-frequency oscillator tubes which are voltage-sensitive as to the frequency of the generated output.

Except for the manner of utilizing the phase difference between the two sets of control pulses, the system shown in Figure 3 is similar to that of Figure 1 and accordingly discussion thereof is limited to that difference.

The two trains of control pulses $a$ and $c$ are respectively applied to the grids 50 and 51 of a pair of triodes comprised in a multivibrator 52 of the so-called "flip-flop" type. The phase relation between the pulses $a$ and $c$ determines the average value of the current which flows through output resistor 53 of the multivibrator and accordingly determines the magnitude of the control voltage applied to the controlled generator 10. As the action of the "flip-flop" circuit is now well understood by those skilled in the art, it appears unnecessary to describe its operation. It here suffices to say that if the interval between the pulses respectively applied to the grids 51 and 50 is short compared to the interval between the application of successive triggering impulses applied to the grid 51; the current impulses traversing resistor 53 are only of short duration whereas if the interval between the pulses applied to the grids 51 and 50 is lengthened, the current pulses through the resistor 53 are correspondingly of longer duration and the unidirectional potential of point $B_1$ is greater. The converse is, of course, true. The resistor 53 and condenser 54 in shunt thereto provide an integrating network for the current impulses so that the control voltage varies slowly with change in the phase relation between the pulses. The deviation of the oscillator frequency from its desired frequency may, as in the system of Figure 1, be determined by reading the magnitude of the control voltage from a suitably calibrated voltmeter, preferably a vacuum-tube voltmeter, a cathode-ray tube or other high-impedance device.

When the frequency of the controlled oscillator 10 of either the system of Figure 1 or Figure 3 is much lower than the molecular resonant frequency $F_g$ of a selected gas and it is not feasible to design or practicable to obtain a narrow bandpass filter 13 suited to pass the very high intermediate frequency $F_1$, a harmonic of the controlled frequency may, as shown in Figure 6, be impressed upon the mixer 19 which may be a crystal rectifier, as shown.

By way of specific example, if it is desired to stabilize an oscillator at a frequency ($F_0$) of 4780 megacycles with the 3, 3 line of ammonia, the amplifier 55 is designed to impress the 5th harmonic of that frequency (23,900 megacycles) upon the rectifier 19; the intermediate frequency-amplifier 13 is accordingly designed to pass the frequency ($F_1$) of 29.9 megacycles which is the difference between the 5th harmonic of the desired operating frequency and the frequency (23,870.1 megacycles) of the selected ammonia line. Therefore in general, the stabilized frequency $F_0$ is $$nF_0 = F_g + F_1 \quad \text{or}$$
$$nF_0 = F_g - F_1$$

where $n$ equals the order of the harmonic.

Of course, if the fundamental frequency is to be applied to the mixer 19, the term $n$ is unity and the previous description of Figure 1 directly applies. It is also to be noted that the selected filter frequency $F_1$ may be zero in which case the filter-amplifier 13 may have the pass characteristic of a video or D. C. amplifier.

In the specific example above given, the microwave generator 16 may be designed to sweep over the frequency range from about 23,850 megacycles to 23,890 megacycles, that is, over a 40 megacycle band within which the gas cell exhibits a sharp molecular resonance. The search frequency at which oscillator 16 is modulated to sweep this 40 megacycle band may conveniently be 60 cycles. In general, the wider the band of frequencies swept by control oscillator 16, the lower the search frequency should be: with wide band sweep and low search frequency, there are fewer corrective pulses per unit of time but the control system under such circumstance is better suited to capture and control an oscillator inherently subject to large drift. The width of the swept band should not be so great as to include both the sum and difference of frequencies $F_1$ and $F_0$ but only ($F_0 + F_1$) or ($F_0 - F_1$): moreover the width of the swept band should not be so great as to include more than one frequency of molecular resonance of gas in cell 14.

When the unidirectional output voltage of the phase-detector 34 of Figure 1 or 52 of Figure 3 is used solely for measurement of frequency-deviation due, for example, to application of frequency-modulation to oscillator 10, and not for stabilization of its frequency, the sweep-frequency of oscillator 16 should be of the same order as or higher than the highest modulating frequency and the time-constant of the RC network (38, 39, Figure 1, or 53, 54, Figure 3) should be correspondingly short.

In the event the stabilized oscillator 10 is not modulated at an audio frequency which would interfere with the desired control action above described, the intermediate radio-frequency filter 13 may be omitted. The purpose of the narrow pass filter 13 was to insure that there was no audio output of the detector-amplifier 42 except when oscillator 16 is generating the proper beating frequency. It is thus insured that the amplifier 42 is energized only as a result of the location of the mean generated carrier-frequency and is not energized by side-band frequencies incident to modulation.

What is claimed is:

1. The method of utilizing a gas exhibiting molecular resonance at a highly precise frequency to stabilize an oscillator at a desired operating frequency which comprises impressing upon the gas frequency-modulated oscillations which repeatedly sweep over a range including said molecular resonant frequency of the gas to produce a train of pulses, producing a second train of pulses each pulse occurring as the difference in frequency between the frequency-modulated oscillations and "$n$" times the generated oscillations, "$n$" being any integer including unity, equals the difference between the molecular resonant frequency of the gas and said desired operating frequency of the generated oscillations, and varying the frequency of the generated oscillations in accordance with variation of the phase difference between the trains of pulses.

2. The method of utilizing a gas exhibiting molecular resonance at a highly precise frequency to stabilize an oscillator at a desired operating frequency which comprises impressing upon the gas frequency-modulated oscillations which repeatedly sweep over a range including said molecular resonant frequency of the gas to produce a train of pulses, producing a second train of pulses each pulse occurring as the difference in frequency between the frequency-modulated oscillations and "$n$" times the generated oscillations, "$n$" being any integer including unity, equals the difference between the molecular resonant frequency of the gas and said desired operating frequency of the generated oscillations, applying a frequency-control voltage to said oscillator, and varying the magnitude of said voltage in accordance with variation of the phase difference between the trains of pulses.

3. The method of utilizing a gas exhibiting molecular resonance at a highly precise frequency to stabilize an oscillator for operation at a desired frequency which comprises producing frequency-modulated oscillations which repeatedly sweep over a range including said frequency of molecular resonance of said gas, beating said frequency-modulated oscillations with the generator oscillations, impressing said frequency-modulated oscillations upon a body of said gas, and controlling the frequency of the generated oscillations in accordance with the time difference between occurrences of absorption by said gas and occurrences of a beat frequency equal to the difference between "$n$" times the generated frequency, "$n$" being any integer including unity, and the molecular resonant frequency of the gas.

4. The method of utilizing a gas exhibiting molecular resonance at a highly precise frequency to stabilize an oscillator for operation at a desired frequency which comprises producing frequency-modulated oscillations which repeatedly sweep over a range including said frequency of molecular resonance of said gas, impressing said frequency-modulated oscillations on said gas, mixing said frequency-modulated oscillations with the generator oscillations to produce a beat frequency which sweeps over a range including the desired difference between the molecular resonant frequency and "$n$" times the generator frequency, "$n$" being any integer including unity, and varying a frequency-control voltage of the oscillator in accordance with the time interval between absorptions of the frequency-modulated oscillations by said gas and occurrence of a beat frequency equal to said desired frequency difference.

5. The method of utilizing the resonant absorption characteristics of a microwave absorptive gas for stabilizing the frequency of a microwave generator which comprises impressing frequency-modulated high-frequency oscillations upon said gas to produce a pulse in each cycle of the modulating-frequency as the high-frequency oscillations sweep through the molecular resonance frequency of the gas, mixing the frequency-modulated oscillations with the oscillations produced by said generator, producing a second pulse in each cycle of the modulating-frequency by selection from the mixing products of the frequency corresponding with the difference between said molecular resonant frequency and the desired frequency of the generator oscillations, and varying a control voltage of the generator in accordance with the time difference of said pulses.

6. The method of utilizing the resonant absorption characteristic of a microwave absorptive gas to stabilize the frequency of a microwave generator which comprises impressing frequency-modulated high-frequency oscillations upon a fixed volume of said gas confined at a pressure less than $10^{-1}$ millimeter of mercury to produce a series of sharp electrical pulses, producing a second series of sharp electrical pulses by beating the generated oscillations with the frequency-modulated oscillations and selecting the beat frequency corresponding with the desired difference between the molecular resonance frequency of the gas and the desired operating frequency of the generator, and varying a frequency-control voltage of the generator in accordance with variation of the phase relation between said series of pulses.

7. The method of utilizing a gas exhibiting molecular resonance at a highly precise frequency to determine the frequency of an oscillator which comprises producing frequency-modulated oscillations which repeatedly sweep over a range including said frequency of molecular resonance of said gas, beating said frequency-modulated oscillations with the generator oscillations, rectifying the resulting beat frequencies to produce a continuous train of unidirectional pulses, producing a second series of unidirectional pulses by impressing said frequency-modulated oscillations upon the gas and rectifying the oscillations transmitted through said gas, and effectively combining said trains of pulses to provide a direct-current voltage corresponding with deviation of the oscillator frequency from a known frequency.

8. The method of utilizing a gas exhibiting molecular resonance at a highly precise frequency to determine the frequency of a microwave generator which comprises the steps of impressing upon the gas frequency-modulated oscillations which repeatedly sweep over a range including said molecular resonant frequency to produce a first series of electrical pulses, beating the frequency-modulated oscillations with oscillations which are "$n$" times the frequency of the generator oscillations, "$n$" being any integer including unity, producing a second series of electrical pulses by selection from the beat frequencies of a known fixed frequency, and producing a unidirectional voltage of magnitude determined by the phase difference between the series of pulses.

9. Apparatus for stabilizing a microwave generator comprising a gas cell containing gas exhibiting molecular resonance at a frequency which differs by a chosen frequency from the desired operating frequency of the generator, means for producing a first series of pulses comprising a control oscillator for impressing on said gas cell frequency-modulated oscillations which sweep a range including the molecular resonance frequency of said gas, a mixer upon which said frequency-modulated oscillations and said generator oscillations at their fundamental or selected harmonic frequency are impressed to produce beat-frequencies including said chosen frequency, means for producing a second series of pulses comprising a frequency-selective network for selecting said chosen frequency from said beat-frequencies, and means for varying a frequency-control voltage of the oscillator in accordance with the phase difference between said two series of pulses.

10. Apparatus for stabilizing a microwave generator comprising a gas cell containing gas exhibiting molecular resonance at a frequency which differs by a chosen frequency from the desired operating frequency of the generator, means for producing a first series of pulses comprising a control oscillator for impressing on said gas cell frequency-modulated oscillations which sweep a range including the molecular resonance frequency of said gas, a mixer upon which said frequency-modulated oscillations and said generator oscillations at their fundamental or selected harmonic frequency are impressed to produce beat-frequencies including said chosen frequency, means for producing a second series of pulses comprising a frequency-selective network for selecting said chosen frequency from said beat-frequencies, and a balanced modulator upon which said two series of pulses are impressed to provide a unidirectional control voltage for said generator and whose magnitude varies with change in phase relation between said two series of pulses.

11. Apparatus for stabilizing a microwave generator comprising a gas cell containing gas exhibiting molecular resonance at a frequency which differs by a chosen frequency from the desired operating frequency of the generator, means for producing a first series of pulses comprising a control oscillator for impressing on said gas cell frequency-modulated oscillations which sweep a range including the molecular resonance frequency of said gas, a mixer upon which said frequency-modulated oscillations and said generator oscillations at their fundamental or selected harmonic frequency are impressed to produce beat-frequencies including said chosen frequency, means for producing a second series of pulses comprising a frequency-selective network for selecting said chosen frequency from said beat-frequencies, and an electronic switch triggered "on" and "off" respectively by successive pulses of the two series to control a frequency-controlling voltage of the generator.

12. Apparatus for determining the operating frequency of a microwave generator comprising a gas cell containing gas exhibiting molecular resonance, a frequency-modulated oscillator for sweeping a range of frequencies including a frequency at which said gas exhibits molecular resonance and a frequency differing by known amount from the normal fundamental frequency of said generator or a known harmonic thereof, means including said gas cell and said frequency-modulated oscillator for producing a first series of pulses whose repetition rate corresponds with the sweep-frequency of said oscillator, means for producing a second series of pulses of the same repetition rate and comprising mixer means upon which oscillations from said generator and of said frequency-modulated oscillator are impressed, and means for measuring the frequency deviation of said oscillator comprising a phase detector upon which said two series of pulses are impressed.

13. Apparatus for producing a unidirectional voltage of magnitude varying as a function of the frequency deviation of a microwave oscillator comprising a gas cell containing gas exhibiting molecular resonance, an oscillator which is frequency-modulated at search frequency to sweep a range of frequencies including a frequency at which said gas exhibits molecular resonance and a second frequency corresponding with the normal fundamental frequency of said microwave oscillator or known harmonic thereof, means including said gas cell and said search oscillator for producing a first series of pulses whose repetition rate corresponds with the search frequency, means for producing a second series of pulses of the same repetition rate comprising mixer means upon which are impressed oscillations of the band swept by the search oscillator and oscillations from said microwave generator, and electrical means upon which said two series of pulses are impressed to produce a control voltage varied in accordance with the phase difference between said series of pulses.

14. In combination, a microwave oscillator having its frequency controllable by a direct current voltage, a comparison circuit, a first energy transmission path from said oscillator to said comparison circuit, means to vary the energy transmission through said path at a low frequency, a second energy transmission path to said comparison circuit for supplying energy thereto pulsating at said low frequency, one of said paths including an enclosed body of gas exhibiting molecular resonance, and means to derive from said comparison circuit a direct current voltage dependent on phase difference in the energy supplied to said comparison circuit through the two said paths, said voltage being applied to said oscillator to stabilize the frequency thereof.

No references cited.